Nov. 8, 1960                     D. B. POWELL                     2,959,649
                         MOTOR OPERATED CIRCUIT BREAKER
Filed Nov. 21, 1958                                              2 Sheets-Sheet 1

INVENTOR.
DAVID B. POWELL
BY
Robert H. Casey
ATTORNEY

INVENTOR.
DAVID B. POWELL
BY
Robert H. Casey
ATTORNEY

United States Patent Office 2,959,649
Patented Nov. 8, 1960

2,959,649

MOTOR OPERATED CIRCUIT BREAKER

David B. Powell, Bristol, Conn., assignor to General Electric Company, a corporation of New York Filed Nov. 21, 1958, Ser. No. 775,619

18 Claims. (Cl. 200—92)

My invention relates to enclosed electric circuit breakers and particularly to operating means for such electric circuit breakers.

Enclosed electric circuit breakers of the type referred to include an insulating casing having a manually operable handle projecting through an aperture in the top wall thereof. While such a circuit breaker is basically a manually operable switching device as contrasted to an electrically operable switching device such as a relay or contactor, it nevertheless is often desirable to be able to operate such circuit breakers automatically, so as to permit their operation from a remote point or interlocking with other circuits, etc. Such circuit breakers must, nevertheless, for safety reasons, be readily capable of manual operation at all times.

In accordance with the prior art, motor-operating mechanisms have commonly been provided for this purpose, such mechanisms being attached to the circuit breaker casing and provided with linkages for operating the manually operable handle of the breaker, the linkages containing a releasable or defeatable element to permit manual operation when desired. Since such mechanisms are attached to the circuit breaker casing and handle, and since the handle must be readily available for manual operation, such mechanisms have been characterized by exposed linkages and moving parts which constitute a hazard to personnel, and which are in danger of becoming jammed by foreign elements accidentally getting caught in the mechanism. In addition, such mechanisms have heretofore been relatively large, projecting a substantial distance from the front of the breaker, and expensive, involving relatively expensive parts such as machined shafts, castings, cams, etc.

It is an object of the present invention to provide a motor-and-manually operable circuit-breaker assembly comprising a motor-operating mechanism which has no exposed moving parts other than the manually operable handle portion.

It is another object of the invention to provide a motor-and-manually operable circuit-breaker assembly comprising a motor-operating mechanism which is extremely compact, and wherein all moving parts other than the motor are contained in a space closely adjacent the top wall of the circuit breaker.

It is a further object of the invention to provide a relatively inexpensive operating mechanism utilizing, primarily, parts of flat stamping or flat sheet metal construction.

Another object of the invention is to provide a motor-operating mechanism which may be attached to and used with an electric circuit breaker without the necessity of making a positive or permanent connection with the breaker operating handle.

It is another object of the invention to provide operating means for transmitting electric power from an electric motor to operate an electric circuit breaker which will ensure that the circuit breaker handle is moved to the full open and closed positions respectively, but which also includes means for absorbing the mechanical shock encountered when such handle reaches the end of its travel, without damage to the parts.

In accordance with the invention, a manually and electrically operable circuit breaker is provided comprising a generally planar supporting pan adapted to be mounted on and in spaced relation to the top wall of a circuit-breaker casing, with an aperture for the circuit breaker handle to permit manual operation of the handle when desired. An electric motor is supported on the top surface of the supporting pan, while handle-operating mechanism is supported on the underside of the pan, in the space between it and the breaker whereby the mechanism is substantially completely enclosed and shielded. Enclosed coupling means is also provided for coupling the motor to the operating mechanism to permit operation of the breaker handle by the motor.

In accordance with another aspect of the invention, a novel operating mechanism is provided utilizing flat sheet metal members primarily, and including a driving crank arm member and a driven handle-operating member. The handle-operating member is movable between two positions in which it is in engagement and out of engagement with the breaker handle respectively, and manually operable means is provided for moving it between these positions.

In accordance with another aspect of the invention, the connection between the crank arm and the handle-operating member comprises a compression spring arranged to be worked in compression at two diametrically opposed points in the cycle of rotation of the crank arm, to permit a small amount of resiliently resisted overtravel of the handle-operating member with respect to the handle, to ensure that the handle is moved its full travel while avoiding danger of breakage.

Additional objects, advantages and novel aspects of the invention will in part be pointed out and in part become apparent from the following detailed description, and the scope of the invention will be particularly pointed out in the appended claims.

Figure 1:
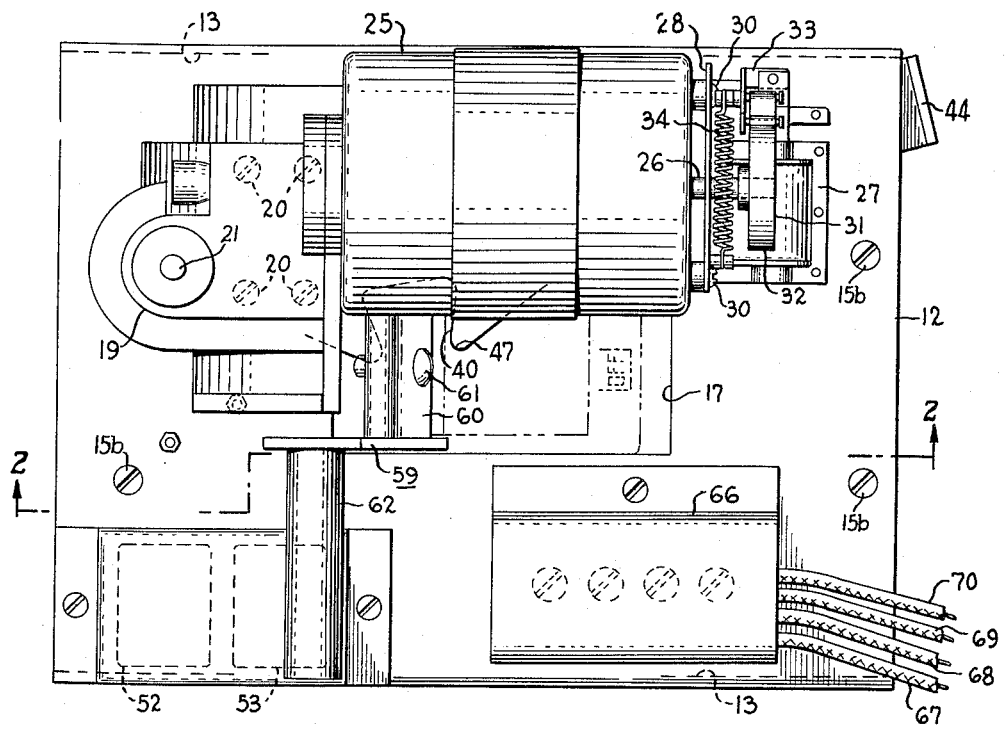
Figure 1 is a top plan view of an electrically and manually operable circuit breaker constructed in accordance with the invention.

In the drawings, the invention is shown as embodied in an electrically and manually operable circuit breaker comprising a manually operable electric circuit breaker 10 having a casing of insulating material and having an operating handle 11 projecting from the top wall thereof and adapted to operate contacts (not shown) contained within the circuit breaker 10 by a generally arcuate reciprocating action.

For the purpose of operating the circuit-breaker handle 11 automatically without preventing manual operation thereof when desired, operating mechanism is provided, including a generally planar supporting pan or plate 12 having short downwardly directed side portions 13 serving to space the main supporting surface of the plate a short distance above the top surface of the circuit breaker. The supporting plate 12 is rigidly attached to the circuit breaker casing 10 by suitable means such as by screws 14 passing through mounting brackets 15 which are rigidly attached to the underside of the supporting plate 12 by means of spacers 15a which are welded to the plate 15 and attached to the plate 12 by means of screws 15b, the screws 14 being threadedly engaged in tapped inserts 16 carried by the casing of the circuit breaker 10.

The supporting plate 12 has a generally rectangular opening 17 located generally centrally thereof and having a portion 18 of the plate adjacent one side of the opening 17 bent down at right angles to the general surface of the plate 12, for a purpose to be described.

A gear-train enclosure 19 is rigidly attached to the upper surface of the supporting plate 12 by suitable means such as by bolts 20, and serves to rotatably support a main operating shaft 21 extending generally perpendicularly of the supporting plate 19 and having its lower end portion projecting through an opening in the supporting plate 12.

A circular-sector shaped cam member 23 is rigidly attached to the lower end of the operating shaft 21 such as by having its integral hub portion 24 fastened to the shaft 21 by suitable means such as by means of a setscrew (not shown). The cam member 23 therefore is rigidly attached to and rotates with the main shaft 21 at all times.

An electric motor 25 is rigidly attached to the gear-train housing 19 and is supported extending above the plate 12 in cantilever fashion with its axis substantially parallel to the plate 12. The drive shaft 26 of the motor 25 is coupled by suitable gearing arrangement, not shown, contained within the gear-train housing 19, so that rotation of the shaft of the motor 25 produces corresponding rotation, at greatly reduced speed, of the cam member 23.

A solenoid-operated type braking mechanism is also provided for the drive shaft 26 of the motor 25 and comprises a solenoid 27 rigidly mounted on a supporting plate 28 by suitable means such as by screws 29, the plate 28 being rigidly attached to the end of the casing of the motor 25 by suitable means such as by screws 30.

The shaft 26 is provided with a brake disk 31 rigidly attached for rotation therewith, and a brake band 32 is provided carried by a lever 33 pivotally mounted on the supporting plate 28 and biased to a normal holding position by means of tension spring 34. The operation of the solenoid-operated brake mechanism is such that when the solenoid 27 is deenergized, the tension spring 34 acts upon the lever 33 to tighten the brake band 32 about the brake disk 31 to prevent rotation of the motor shaft 26.

Figure 3:
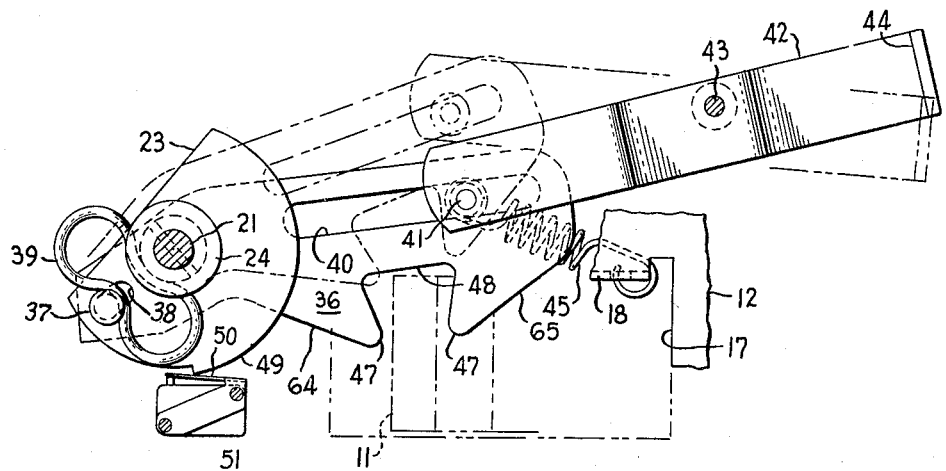
Figure 3 is a top plan view taken generally on lines 3—3 of Figure 2, the supporting plate being omitted.

For the purpose of transforming rotation of the main operating shaft 21 constituting the output shaft of the gear train 19 into reciprocating operation of the circuit breaker operating handle 11, mechanism is provided, in accordance with the invention as shown more particularly in Figure 3 of the drawings.

As shown in the drawing, the handle-operating mechanism comprises cam member 23 which has an elongated operating member 36 pivotally connected thereto by means of a pivot pin 37 extending through an elongated hole 38 in the cam member 23, said hole being elongated in a radial direction. The pivot pin 37, which is rigidly carried by the member 36, is biased away from the operating shaft 21 by compression spring means comprising a wire spring member 39 shaped so as to generally resemble a figure-8 and having two oppositely disposed seat portions in the hub 24 and the pin 37 respectively, and biasing them apart in a radial direction. It will be observed that regardless of the rotational position of the cam member 23, the action of the spring 39 is always such as to urge the pin 37 radially away from the shaft 21.

Figure 2:
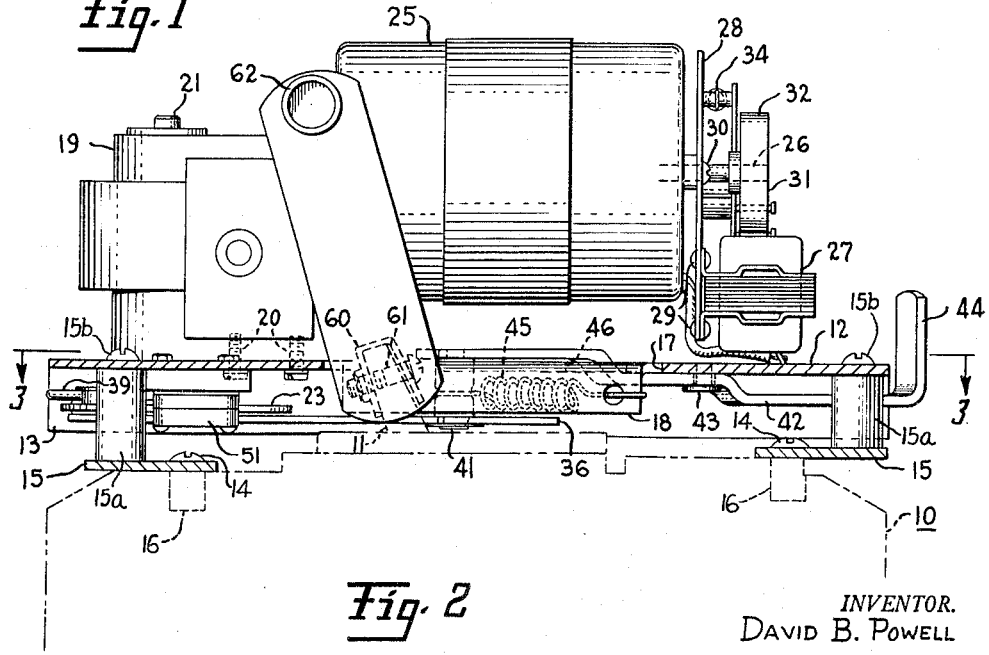
Figure 2 is a sectional elevation view taken generally on the line 2—2 of Figure 1.

The member 36 is provided with an elongated opening or slot 40 in the intermediate portion thereof receiving a guide pin 41, which is normally stationary and is carried by a lever 42. The lever 42 is pivotally supported on the underside of the supporting plate 12 by pivot pin 43 and has its outward end turned upwardly at 44 to facilitate manual operation thereof. The lever 42 is constantly biased in a counterclockwise direction by means of tension spring 45 which is anchored in the downwardly projecting portion 18 of the plate 12 projecting into the generally central aperture 17, the other end of the tension spring 45 being attached to the pin 41. The bias of the spring 45 serves to hold the lever 42 normally in an extreme counterclockwise position, in which the end portion thereof adjacent the upwardly bent portion 44 rests against the downwardly bent side portion 13 of the supporting plate 12. The pin 41 is normally stationary in the position shown in Figure 3. The outer portion of the lever 42, i.e., the portion adjacent the manually engageable portion end 44 extends under the surface of the mounting plate 12, i.e., between the plate 12 and the circuit breaker 10. The inner portion of the lever 42, however, is brought upwardly through an opening 46 in the supporting plate 12 and extends along the upper surface of the plate 12, as shown particularly in Figure 2. The lever 42 thus includes portions which ride against the opposite surfaces of the supporting plate 12, thereby providing substantially rigid guiding surfaces for guiding the lever 42 and the member 36 connected thereto. The lever 36 is also provided with an opposed pair of projections 47 defining a handle-receiving notch or opening 48 adapted to receive a portion of the circuit breaker handle 11 therein.

Rotation of the cam member 23 causes the pin 37 to move in a circular path and, since the operating member 36 is restrained by its sliding engagement with the normally stationary guide pin 41, this member moves in a generally rectilinearly reciprocating fashion although assuming various angular positions as the pivot pin 37 moves in circular fashion. The handle-receiving aperture 48 is designed to provide clearance for such angular movement of the member 36 by tapering inwardly as shown, the projections 47 engaging opposite sides of the circuit breaker handle 11 and serving to oscillate the handle 11 between its extreme positions corresponding to "on" and "off" positions of the circuit breaker. The connection between the handle-operating member 36 and the handle 11 is, in other words, a pivotal connection.

Figure 4:
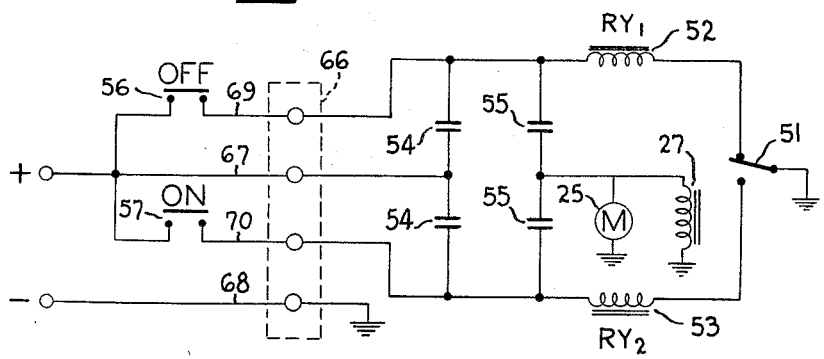
Figure 4 is a schematic drawing of the connection of the circuit-controlling elements of the invention of Figure 1.

For the purpose of disconnecting the electric motor 25 when the operating member 36 has reached a predetermined position, the cam member 23 is provided with an active cam surface 49 which is arranged to engage the actuating member 50 of the switch 51 to move the movable contact thereof into engagement with a predetermined one of two relatively stationary contacts as shown in the schematic diagram of Figure 4.

Referring to the schematic diagram of Figure 4, a pair of relays 52 and 53 are provided, each serving to operate a pair of contacts as shown. The relays 52 and 53 are each provided with a pair of contacts 54 and 55, the contacts 54 being connected as hold-in contacts to maintain power to the relay after it has once been closed by push-button action such as by actuation of either of the push-button switches 56 and 57. The other contacts 55 of each relay serve to control power applied to the motor 25 and to the brake solenoid 27.

Thus with the movable contact of the switch 51 in contact with a given relay 52 or 53, the push button 56 or 57 which controls power to such relay may be actuated and will initially actuate such relay. Upon initial actuation, such a relay locks in through its hold-in contacts 54 and applies power through its contacts 55 to the motor 25 and to the brake release solenoid 27. When the motor 25 has driven the control cam 23 to a position which actuates the limit switch 51 to the opposite condition, the power to the motor and to the brake release solenoid is interrupted. The tension spring 34 is then free to apply braking force to the shaft 26 of the motor 25 to prevent overtravel. The opposite relay is then conditioned for actuation, which may be initialed by depressing the other of the push buttons 56, 57.

The strength of the spring 39 is so chosen relative to the strength of the operating spring of the circuit breaker 10 that the pin 37 is maintained in the outer end of the elongated slot 38 at all times except at the end points of the travel of the member 36. The travel of the member 36 is so chosen relative to the travel of the operating handle 11 so as to be slightly greater so as to require a small amount of overtravel at both ends of the operating stroke. By reference to Figure 3, it will be observed that if the cam member 23 is assumed to be moving in a counterclockwise direction so that the member 36 is moving to the right as viewed, and assuming that the operating handle 11 encounters a dead stop before the member 36 reaches the extreme of its travel, continued rotation of the operating cam member 23 causes a slight compression of the spring member 39 with the pin 37 moving radially inwardly relative to the slot 38. Conversely, upon continued rotation, such as to move the member 36 toward the left as viewed, and assuming that the handle 11 encounters a positive stop before the member 36 is moved to the extreme of its travel, the same action will occur, the member 39 being compressed upon further rotation of the member 23 and the pin 37 moving inwardly of the slot 38. This action prevents damage to the mechanism or to the circuit-breaker handle such as might occur if such resilience were not provided and if the travel of the operating member 36 were in excess of the travel of the operating handle 11. In order to operate the circuit-breaker handle 11 manually when desired, such as in cases of power failure or other emergency, it is only necessary to move the lever 42 manually by the portion 44 clockwise as viewed in Figure 3, against the bias of the spring 45. This moves the guide pin 41 upwardly as viewed, away from the central aperture 17, pivoting the elongated operating member 36 about pin 37, and withdrawing the projections 47 from engagement with the handle member 11. This leaves the handle member 11 free to be operated by manual engagement. For the purpose of facilitating such manual operation, I provide a generally crank-shaped handle extension shown particularly in Figure 1, comprising a generally U-shaped handle engaging portion 60 rigidly attached to the handle 11 by suitable means such as by bolt 61. The handle-operating crank 59 also includes a manually engageable portion 62 projecting generally parallel to the handle engaging portion 60. The handle extension 59 is preferably left in mounted position on the operating handle 11, and does not interfere with the operation of the motor-operated portion of the mechanism. Following manual operation of the circuit-breaker handle 11, the electrical operation may be resumed at any time regardless of the respective positions of the handle 11 and the operating member 36. When these members are in different positions, operation of the electric motor-operated mechanism causes either of the surfaces 64 and 65 to ride against the edge of the handle member 11 until the handle-receiving aperture 48 registers with the handle 11 whereupon the tension of the spring 45 causes these parts to re-engage in operating relation.

A terminal block 66 is also provided on the supporting plate 12 and contains terminals for connecting the power conductors 67 and 68 and the push-button control wires 69 and 70 to their respective components.

While I have shown my invention in one particular embodiment, it will be readily apparent that many modifications thereof can be made by those skilled in the art, and I therefore intend, by the appended claims, to cover all such modifications as fall within the true spirit and scope of the invention.

What I claim as new and desire to secure by Letters Patent of the United States is:

1. In combination, an electric circuit breaker comprising an insulating casing having a generally planar top surface and an operating handle projecting from said surface and oscillatable between "on" and "off" positions, electric motor-driven operating mechanism for operating said handle comprising a main driving shaft rotatably supported and extending generally perpendicular to said top surface, a handle-operating member having means for engaging said operating handle, and connecting means connecting said driving shaft and said handle-operating member for causing generally rectilinear reciprocating movement of said operating member in a plane parallel to and adjacent said top surface in response to rotation of said driving shaft to move said handle between said "on" and "off" positions.

2. In combination, an electric circuit breaker comprising an insulating casing having a generally planar top surface and an oscillatable operating handle projecting from said top surface, electric motor-driven operating means for operating said operating handle comprising a main driving shaft rotatably supported and extending generally perpendicular to said top surface, a handle-operating member having means for engaging said operating handle, means connecting said driving shaft to said operating member for causing generally rectilinear reciprocating movement of said handle-operating member in a plane parallel to and adjacent said top surface in response to rotation of said driving shaft, said connection between said handle-operating member and said operating handle being releasable, and manually operable means for releasing said engagement.

3. In combination with an electric circuit breaker having an insulating casing with a generally planar top wall and an oscillatable operating handle projecting from said top wall, electric motor-driven operating mechanism for said handle comprising a main driving shaft rotatably supported and extending perpendicular to said top wall, a handle-operating member, means connecting said driving shaft and said handle-operating member for causing generally rectilinear reciprocating movement of said handle-operating member in a plane generally parallel to and adjacent said top wall upon rotation of said driving shaft, means carried by said handle-operating member releasably engaging said operating handle of said circuit breaker, said handle-operating member being pivotally movable about its connection with said driving shaft to a position in which it is out of engagement with said operating handle, and manually operable means for moving said handle-operating member between said engaged and disengaged positions.

4. In combination with an electric circuit breaker having an insulating casing with a generally planar top wall and an oscillatable operating handle projecting from said top wall, electric motor-driven operating mechanism comprising a main driving shaft rotatably supported generally perpendicular to said top wall, a generally planar handle-operating member, means connecting said operating member to said driving shaft for causing generally rectilinear reciprocating movement of said operating member in a plane generally parallel to and adjacent said top wall upon rotation of said driving shaft, said operating member having a notch cut in from one edge thereof to receive a portion of said operating handle therein, said operating member being pivotally movable about its engagement with said driving shaft between a first position in which said operating handle is received in said notch and a second position in which said operating handle is out of said notch, and manually operable means for moving said handle-operating member between said first and second positions.

5. In combination with an electric circuit breaker having an insulating casing with a generally planar top wall and an oscillatable handle projecting therefrom, electric motor-driven operating mechanism comprising a main driving shaft rotatably supported generally perpendicular to said top surface, a handle-operating member, means connecting said handle-operating member to said driving shaft for causing generally rectilinear reciprocating movement of said operating member in a plane parallel to said top surface upon rotation of said driving shaft, a releasable engagement between said handle-operating member and said operating handle, said operating member being pivotally movable about its connection with said driving shaft in a plane substantially parallel to said top surface between a first position in which it is in engagement with said operating handle and a second position in which it is out of engagement with said operating handle, spring means biasing said operating member toward said engaged position, a pair of guide surfaces carried by said operating member on either side of said handle engaging means, said biasing spring urging said guide surfaces against a portion of said operating handle when said operating member and said operating handle are out of register whereby said operating member slides along said operating handle until said handle engaging means registers with said handle and said biasing spring then moving said operating member into engagement with said operating handle.

6. In combination, an electric circuit breaker having an insulating casing with a generally planar top wall and an oscillatable operating handle projecting therefrom, an electric motor-driven operating mechanism comprising a handle operating member, electric motor-driven means for causing movement of said handle-operating member in generally rectilinear path in a plane parallel to said top wall, said handle-operating member being movable between a first position in which it is in driving engagement with said operating handle and a second position in which it is out of engagement with said operating handle by pivotal movement about its connection with said electric motor-driving means, said operating member having an elongated guide slot therein, a normally stationary guide pin in said slot, and manually operable means for moving said guide pin to move said handle-operating member from said first position to said second position to permit direct manual operation of said operating handle.

7. The combination as set forth in claim 6 wherein said means for moving said guide pin comprises a carrier pivotally mounted for rotational movement in a plane parallel to said top surface, said guide pin being carried by said carrier, and said carrier including a manually engageable handle portion.

8. In combination with an electric circuit breaker having an insulating casing with a generally planar top wall and an oscillatable handle projecting therefrom, electric motor-driven operating mechanism comprising a driving shaft rotatably supported and extending generally perpendicular to said top surface, a crank arm connected to said main driving shaft, an operating member pivotally connected to said crank arm at a point spaced away from said driving shaft and movable reciprocally in a plane generally parallel to and adjacent said top wall of said circuit breaker casing and a pivotal connection between said handle-operating member and said circuit breaker operating handle.

9. In combination with an electric circuit breaker having an insulating casing with a generally planar top wall and an oscillatable operating handle projecting therefrom, electric motor-driven operating mechanism comprising a main driving shaft supported perpendicular to said top surface, a crank arm connected to said main operating shaft for rotation in a plane parallel to said top surface, a handle-operating member pivotally connected to said driving shaft for generally rectilinear movement in a plane parallel to said top surface, said handle-operating member being pivotally movable about said pivotal connection with said crank arm in a plane parallel to said top surface between a first position in which it is in engagement with said circuit breaker operating handle and a second position in which it is out of engagement with said operating handle, a normally stationary member, said operating member having a pin and slot guiding engagement with a portion of said normally stationary member, said normally stationary member being movable manually to a retracted position to move said handle-operating member from said first position to said second position to permit direct manual operation of said circuit breaker handle.

10. The combination as set forth in claim 9 wherein said pin and slot engagement comprises a guiding pin carried by said normally stationary member and an elongated slot in said handle-operating member, said normally stationary member being pivotally supported for rotation in a plane parallel to said top surface, and biasing means biasing said normally stationary member to retain said handle-operating member in said first position.

11. In an operating mechanism for an operating handle of an electric circuit breaker, a driving member comprising an electric motor-driven crank arm, a driven member comprising a handle-operating member pivotally connected to said crank arm guided for generally rectilinear reciprocating movement upon rotation of said crank arm and having an operating engagement with said circuit-breaker handle, said crank arm having a radially elongated slot therein, said operating member having a pin rigidly carried thereby and extending into said slot, and compression spring means carried by said crank arm urging said pin away from said pivotal support of said crank arm at all times.

12. Operating mechanism for an operating handle of an electric circuit breaker comprising a crank arm pivotally supported for rotation about a first pivotal support, a handle-operating member having an engagement with said circuit breaker operating handle, means guiding said operating member for generally rectilinear reciprocating movement, means connecting said operating member and said crank arm comprising a radially elongated slot in said crank arm, a pin rigidly carried by said handle-operating member and extending into said slot, compression spring means urging said pin radially outwardly of said crank arm comprising a resilient member having at least one generally C-shaped portion engaging said supporting shaft of said crank arm and said pin near the open ends of said C respectively.

13. The combination as set forth in claim 12 wherein said compression spring means includes two integral confronting C-shaped portions forming a figure-8 shape and engaging said shaft and said pin at the mid-points of the opposite sides thereof.

14. In combination with an electric circuit breaker having an insulating casing with a generally planar top wall and an operating handle projecting therefrom, electric motor-driven operating mechanism comprising a main driving shaft supported generally perpendicular to said top surface, a handle-operating member supported for generally rectilinear reciprocating movement in a plane parallel to said top wall, means connecting said handle-operating member to said circuit breaker handle, connecting means between said driving shaft and said handle-operating member comprising a cam member having at least a portion of the edge thereof comprising an active cam surface, a two-position switch including an actuator adapted to be engaged by said active cam surface and held in a first position during a portion of the rotation of said driving shaft, said switch including biasing means adapted to move said switch to a second position upon disengagement from said active cam surface during the remaining portion of movement of said cam member, said switch being connected to deenergize said driving motor upon change of said switch from one position to the other.

15. Electric motor-driven operating mechanism for use with an electric circuit breaker having an insulating casing with a generally planar top wall and an oscillatable operating handle projecting therefrom, comprising a generally planar supporting pan, means for mounting said supporting pan in parallel spaced relation to said top wall of said circuit breaker, said supporting pan having a generally central aperture for admitting a portion of said circuit breaker handle to permit manual operation thereof from above said pan, an electric motor mounted on the top surface of said supporting pan, handle-operating mechanism carried by said supporting pan at the underside thereof in the space between said breaker and said pan and operatively connected to said circuit breaker handle, and means connecting said motor to drive said mechanism to cause operation of said handle upon operation of said motor.

16. Electric motor-driven operating mechanism for use with an electric circuit breaker having an insulating casing with a generally planar top wall and an oscillatable handle projecting therefrom, comprising a generally planar supporting pan, mounting means for supporting said pan on said top wall of said breaker in spaced relation thereto, a generally central aperture in said supporting pan for receiving a portion of said circuit breaker handle to permit manual operation thereof from above said pan, an electric motor mounted on the top wall of said supporting pan, operating mechanism carried by said supporting pan at the underside thereof in the space between said breaker and said pan comprising a crank arm formed of sheet metal having its major plane parallel to the major plane of said supporting pan, a handle-operating member of sheet metal having its major plane parallel to the plane of said pan and connected for operation by said crank arm, said handle-operating member being movable between a first position in which it is in engagement with said circuit breaker handle and a second position in which it is out of engagement with said circuit-breaker handle, an elongated guiding slot in said handle-operating member, a movable guide member having a guide pin portion extending into said guiding slot and having a handle portion projecting beyond said pan for manual engagement, said guide member being manually movable to move said handle-operating member between said first and second positions, and spring means biasing said guide member to a position in which said handle-operating member is in said first position.

17. The combination set forth in claim 16 wherein said guide member comprises a member of sheet metal having its major plane parallel to the plane of said supporting pan and having a substantial portion thereof extending in flatwise sliding engagement with a surface of said supporting pan.

18. In an operating mechanism for an operating handle of an electric circuit breaker, a driving member comprising an electric motor-driven crank arm, a driven member comprising a handle-operating member pivotally connected to said crank arm and guided for generally rectilinear reciprocating movement upon rotation of said crank arm and having an operating engagement with said circuit breaker handle, said pivotal connection between said handle-operating member and said crank arm comprising a bearing member carried by said handle-operating member and means supporting said bearing member on said crank arm, said supporting means permitting limited movement of said bearing member toward and away from the axis of rotation of said crank arm, and means resiliently biasing said bearing member away from said axis of rotation, whereby said bearing member may move a small amount radially of said crank arm.

References Cited in the file of this patent
UNITED STATES PATENTS

| | | |
|---|---|---|
| 2,675,442 | Van Ryan | Apr. 13, 1954 |
| 2,845,509 | Brumfield | July 29, 1958 |